Sept. 1, 1936.  G. A. LUBURG  2,053,093
AMPHIBIAN LANDING GEAR
Filed Dec. 9, 1933   2 Sheets-Sheet 1

INVENTOR.
GUY A. LUBURG.
BY
ATTORNEYS.

Sept. 1, 1936.  G. A. LUBURG  2,053,093
AMPHIBIAN LANDING GEAR
Filed Dec. 9, 1933  2 Sheets-Sheet 2

INVENTOR.
GUY A. LUBURG.
BY
ATTORNEYS.

Patented Sept. 1, 1936

2,053,093

UNITED STATES PATENT OFFICE 2,053,093

AMPHIBIAN LANDING GEAR

Guy A. Luburg, Snyder, N. Y., assignor to Curtiss Aeroplane & Motor Company, Inc., a corporation of New York Application December 9, 1933, Serial No. 701,605

2 Claims. (Cl. 244—2)

This invention relates to aircraft, and is more particularly concerned with improvements in retractable landing gears for amphibians.

Generally, the invention provides a wheeled landing gear for a flying boat or a seaplane, equipped with a boat hull or pontoons, respectively, wherein the major portion of the wheeled landing gear may be retracted within recesses formed in the bottom of the flotation body. When so retracted, the aircraft may alight on water. The landing gear may be extended from its retracted position, so that the wheels are in position for ground contact. The bottom of the flotation body is especially arranged to avoid excessive drag in the water when the landing gear is retracted. As is well known in the art, aircraft flotation bodies are provided with a step intermediate their length, the hull bottoms fore and aft of the step slanting at an obtuse angle from each other. In my invention, I provide an auxiliary step forward of the main step, and locate the recesses for the wheeled landing gear in the bottom portion intermediate the auxiliary and main steps. By this construction, the wheeled landing gear is longtudinally located forward of the center of gravity of the aircraft, while the main step is, as is the usual practice, located below or only slightly aft of the center of gravity of the aircraft. The auxiliary step ahead of the wheeled landing gear assists the action of rising to the main step when the aircraft is taking off. When the aircraft has risen to plane upon the main step, the forward portion of the hull is principally out of water, and the auxiliary step then becomes inactive. Sufficient smooth bottom area is provided between the wheel recesses and the main step so that proper planing and flotation action will take place when the aircraft is planing on the main step, prior to and up to take-off speeds.

It is an object of the invention, therefore, to provide an amphibian landing gear wherein the landing wheels may be retracted into recesses in the bottom of the flotation body.

A further object is to provide recesses for a wheeled landing gear forward of the main step of the flotation body.

A further object is to provide an auxiliary step in the flotation body forward of the main step.

A still further object is to provide landing wheel recesses between the auxiliary and main steps of the flotation body.

Another object is to provide a wheeled landing gear for an amphibian aircraft wherein, with the wheels extended for ground contact, the landing gear tread is of considerable magnitude with relation to the width of the flotation body.

Another object is to provide a wheeled landing gear which may be moved a minimum amount to fully extend or fully retract it.

A still further object is to provide means for extending and retracting a wheeled landing gear from and within a water flotation body.

Further objects will be apparent from a reading of the subjoined specification and claims and from a consideration of the drawings, in which similar numbers indicate similar parts, and in which:

Figure 1:
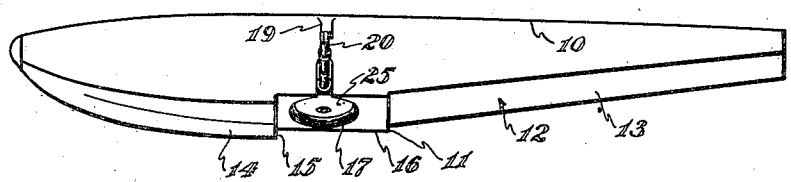
Fig. 1 is a side elevation of an aircraft pontoon embodying the invention.
Figure 2:
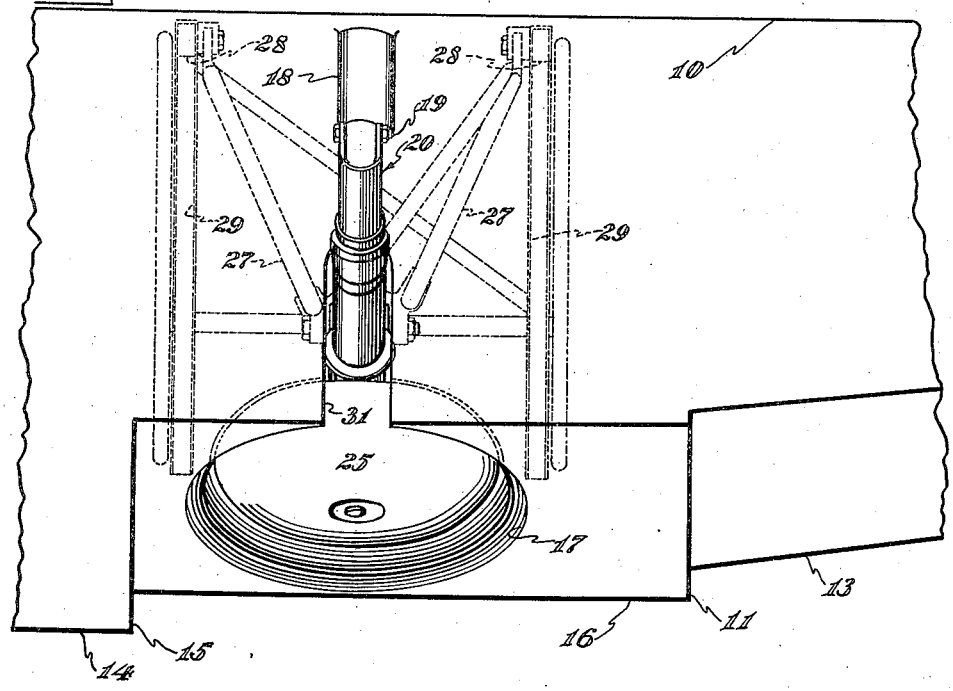
Fig. 2 is an enlarged fragmentary side elevation of that portion of the pontoon by which the wheeled landing gear is carried, showing also in dotted lines, certain of the structure of the wheeled landing gear.
Figure 3:
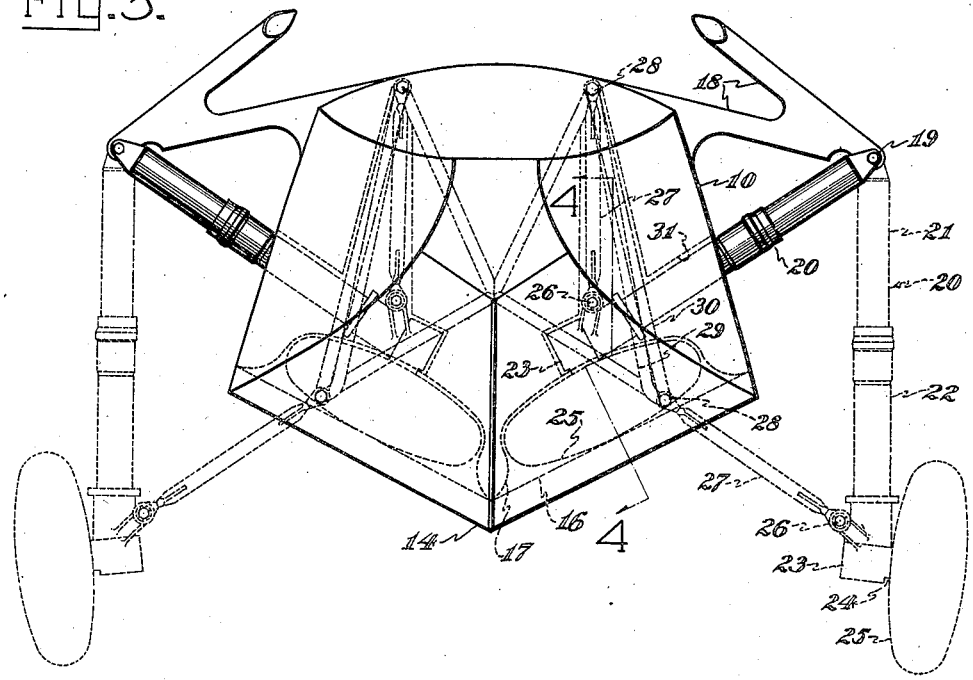
Fig. 3 is a front elevation of the pontoon, showing the wheeled landing gear in extended and retracted positions.
Figure 4:
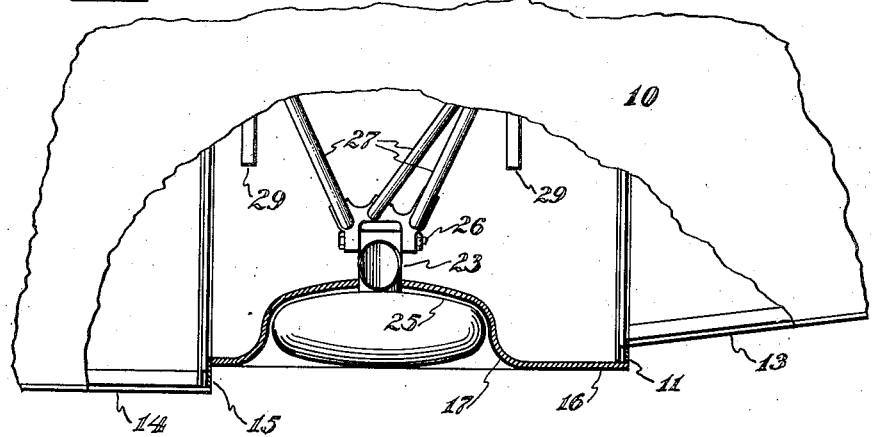
Fig. 4 is a section on the line 4—4 of Fig. 3.

An aircraft pontoon 10, of otherwise well known and conventional design, is provided with a main step 11 intermediate the pontoon length and dividing the pontoon bottom 12 into a rearward portion 13 and a forward portion 14, the step being located, as is the usual practice, below and slightly aft of the airplane center of gravity. An auxiliary step 15 divides the bottom forwardly of the main step 11 to provide an intermediate bottom portion 16. Generally speaking, the intermediate portion 16 and the forward portion 14 of the bottom, are in substantially parallel planes. In the intermediate portion 16, a circular recess 17 is formed on each side of the plane of symmetry of the pontoon 10. It is understood that the pontoon 10 is of conventional V-bottom construction, as shown in Fig. 3, and that duplicate recesses 17 are provided on each side of the plane of symmetry of the pontoon.

From the upper deck of the pontoon, rigid struts 18 extend laterally to hold a bearing 19 laterally spaced from the pontoon. On this bearing 19 is carried a strut 20 which may be a shock absorbing strut of conventional form comprising a plunger 21 slidable against suitable springs, compressed air or other resilient media, within a cylindrical portion 22. A fitting 23 at the bottom of the strut 20 carries an axle 24 on which a wheel 25 is carried for rotation. The fitting 23 is also provided with an inboard pivot 26, on which is mounted a strut framework 27 extending inwardly to support, at its inner end, rollers 28. For longitudinally bracing the landing gear against landing shocks, these rollers 28 are longitudinally spaced and engage in longitudinally spaced guideways 29 within the pontoon structure. The guideways 29 extend upwardly within the pontoon, and means 30 are provided to translate the rollers 28, with the struts 27, along the guideways 29 so that the landing gear may be extended or retracted. Such means 30 may comprise chains, cables or other devices well known in the art. It will thus be seen that, when the rollers 28 are drawn upwardly in the guideways 29, the struts 20 and 27, with the wheel 25, are swung in a transverse plane, to be drawn inwardly and upwardly within the pontoon, so that the wheel 25 nests in the recess 17. The relationship of the struts, wheel and recess is so arranged that the outer surface of the wheel 25, when in its retracted position, lies substantially flush with the bottom surface 16 of the pontoon. It will be noted that in retracting the landing gear, the whole assembly swings about the bearing 19. The landing gear may be extended by reversing the travel of the rollers 28 in the guideways 29, whereby the landing gear is pushed downwardly and outwardly to occupy a ground contacting position such as is represented by the dotted lines in Fig. 3. The bearing 19 may be so spaced with respect to the aircraft that the tread between the landing wheels when extended is considerably wider than the width of the pontoon. In their extended position, the shock absorbing struts 20 assume a substantially vertical attitude to most efficiently assume landing shocks imposed upon them.

It is to be understood that the specific arrangement of retracting mechanism as shown, may be varied without detracting from the scope of the invention except as limited by the appended claims. For instance, the struts 27 may be organized to buckle for extension or retraction of the landing gear, instead of being translated along guideways as shown.

At each side of the pontoon, a suitable slot 31 is provided for the passage of the strut 20 when the wheel 25 is retracted. It will be seen that the major portion of the wheeled landing gear, when retracted, is enclosed within the confines of the pontoon, so that the parasite resistance of such wheeled landing gear may be considerably reduced when the aircraft is in flight.

It will be seen that the bottom portion 16 of the pontoon is organized to present a considerable plane area forward of the step 11, so that when the aircraft is being propelled at speed upon the water, this bottom area will be adequate to support the weight of the craft. The angular relationship between the bottom portions 16 and 13 is such that the fore and aft rocking movement of the aircraft and pontoon may be accomplished to more readily assist the aircraft in taking off. The auxiliary step 15, forward of the wheeled landing gear, will likewise assist the aircraft to rise to the main step 11 in taking off.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an amphibian airplane, in combination, a float provided with a V-bottom and with longitudinally spaced rearwardly facing transversely extending steps, said bottom, intermediately of said steps, and nearer to the forward step, and at opposite sides of the fore and aft center line of said V-bottom, having formed therein substantially circular recesses, retractable landing gear wheels adapted, when extended, to occupy positions, one each at opposite sides of and well below the float bottom outboard of the chines thereof, and said wheels, when retracted, being adapted to occupy positions, respectively, within said recesses, and means to move said wheels from an extended to a retracted position and vice versa.

2. In an amphibian airplane, in combination, a float provided with a V-bottom and with longitudinally spaced rearwardly facing transversely extending steps, said bottom, intermediately of said steps, and nearer to the forward step, and at opposites ides of the fore and aft center line of said V-bottom, having formed therein substantially circular recesses, each of which, at its outer edge, is open to a transverse slot formed in the float and extended through and upwardly beyond the chines thereof, retractable landing gear wheels adapted, when extended, to occupy positions, one each at opposite sides of and well below the float bottom outboard of said chines, and said wheels, when retracted, being adapted to occupy positions, respectively, within said recesses, means carrying said wheels and fastened to said float and movable during wheel extension and retraction to passages respectively partly within and wholly without said transverse slots, and means to so move the retractable wheeled landing gear.

GUY A. LUBURG.